(12) United States Patent
Burris

(10) Patent No.: US 6,277,291 B1
(45) Date of Patent: *Aug. 21, 2001

(54) FLOWTHROUGH BATCH LIQUID PURIFIER

(76) Inventor: William Alan Burris, 7 E. Jefferson Cir., Pittsford, NY (US) 14534

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,897

(22) Filed: Jan. 9, 1998

(51) Int. Cl.$^7$ ........................................... C02F 1/78
(52) U.S. Cl. ................... 210/760; 210/739; 210/95; 210/103; 210/205; 222/159
(58) Field of Search .......................... 210/760, 739, 210/95, 103, 205, 206, 252, 258, 259; 222/154, 159, 464.3, 505

(56) References Cited

U.S. PATENT DOCUMENTS

| | | | |
|---|---|---|---|
| 1,067,583 | * 7/1913 | Brague | 222/505 |
| 2,377,261 | * 5/1945 | Norris | 222/505 |
| 3,772,188 | * 11/1973 | Edwards | 210/760 |
| 3,841,484 | * 10/1974 | Domnick | 210/95 |
| 4,869,831 | * 9/1989 | Hinkle, II | 210/95 |
| 5,075,016 | * 12/1991 | Barnes | 210/760 |
| 5,207,993 | * 5/1993 | Burris | 210/138 |
| 5,302,288 | * 4/1994 | Meidl et al. | 210/760 |
| 5,531,908 | * 7/1996 | Matsumoto et al. | 210/760 |
| 5,766,488 | * 6/1998 | Uban et al. | 210/760 |
| 5,776,351 | * 7/1998 | McGinness et al. | 210/760 |

FOREIGN PATENT DOCUMENTS 3-56195   *  3/1991  (JP).

* cited by examiner

Primary Examiner—David A. Simmons
Assistant Examiner—Frank M. Lawrence
(74) Attorney, Agent, or Firm—Eugene Stephens & Associates

(57) ABSTRACT

A batch liquid purifier uses a detachable container for a batch of liquid to be purified and flows the liquid from the container to a purified liquid dispenser while contacting the liquid with an ozone-containing gas. To ensure that a leading volume of the liquid flow is adequately contacted with ozone, the gas and liquid flow is mixed and directed to an upflow chamber in which gas bubbles overtake the leading liquid flow. Bubbles rising in the liquid flow are also displayed and illuminated to show that the purifier is operating.

58 Claims, 3 Drawing Sheets

FLOWTHROUGH BATCH LIQUID PURIFIER

TECHNICAL FIELD

Ozone purification of small batches of liquid with countertop sized equipment.

BACKGROUND

This invention advances from my previous U.S. Pat. No. 5,207,993, entitled Batch Liquid Purifier. It addresses and solves problems involved in the reliable purification by ozone treatment of small batches of liquid, such as required for household purification of water, for example. The problems include: ensuring that no liquid evades ozone treatment, making the ozone treatment reliable for purifying the liquid, informing the user that the purifier is operating properly, preventing ozone from escaping in any harmful quantity, ensuring that the purifier operates consistently and effectively without harm to itself or the user, and accomplishing these and related goals at a reasonably low manufacturing cost in a purifier that operates conveniently.

SUMMARY OF THE INVENTION

I have improved on a batch liquid purifier of the flowthrough type by ensuring ozone purification of an initial flow of liquid that begins the purification process. Although some liquid flow inevitably occurs before full mixing of an ozone-containing gas with the flowing liquid, the initial flow enters an upflow chamber in which bubbles of ozone-containing gas rise at a faster rate than the rising liquid so that ozone-containing gas overtakes and purifies whatever liquid initially precedes the flow of ozone. This also allows an upflow or alternative chamber to be arranged as a visible display of rising bubbles showing that the purifier is operating.

Features relating to the contacting of all the liquid with ozone include structuring the flowthrough passageway downstream of the upflow chamber to ensure sufficient contact between ozone and the liquid to purify the liquid before it reaches a dispenser. Also, liquid is prevented from entering the passageway except when the purifier is operating, and an ozone generator is operated before liquid enters the passageway so that plenty of ozone is ready for mixing with the initial liquid flow. My improvement also preferably includes a disconnectable container; a dispensing spout that is movable; and switches, valves, and indicators safeguarding reliable purification and convenient dispensing without harm to the equipment or the user.

DRAWINGS

Figure 1:
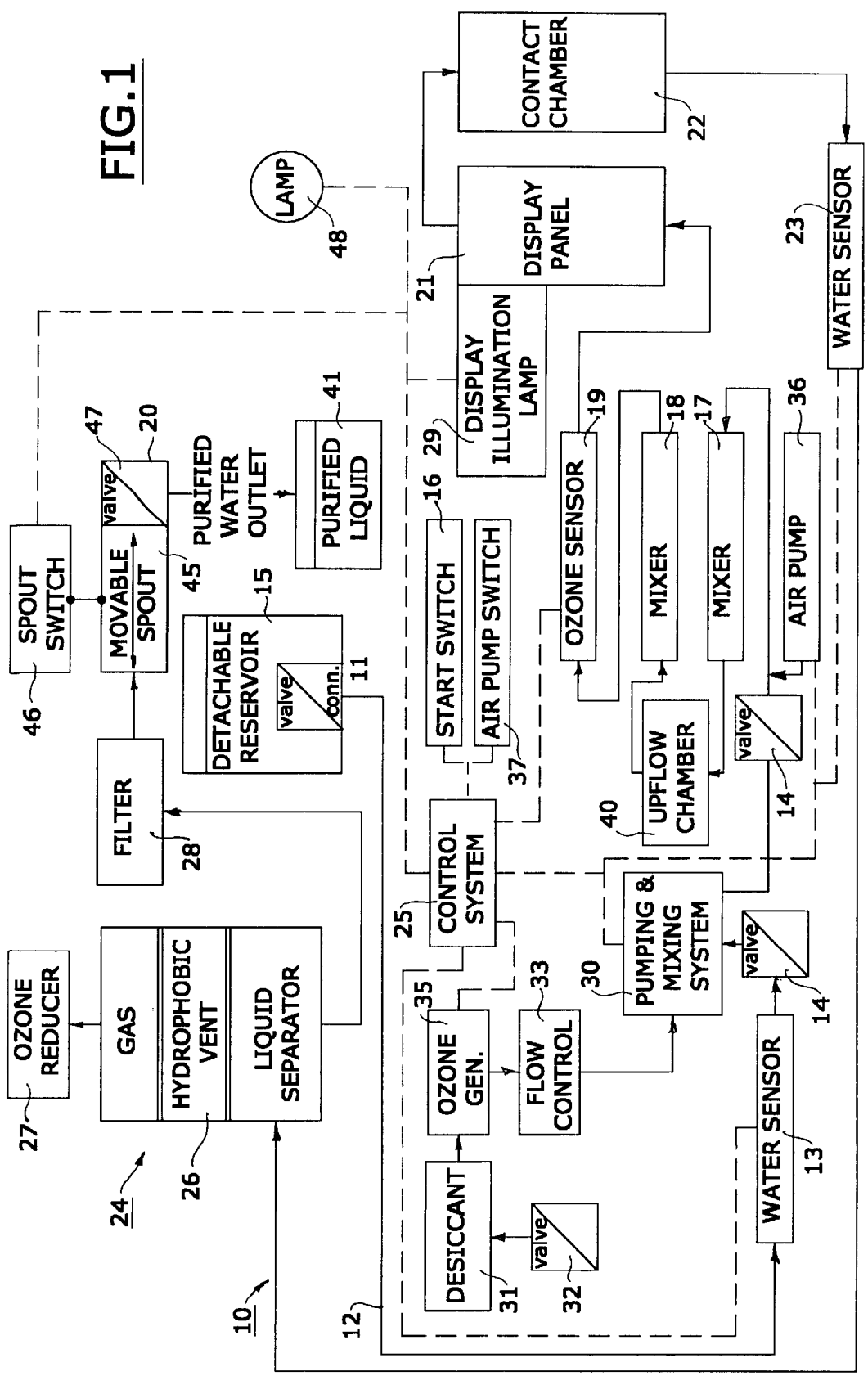
Figure 2:
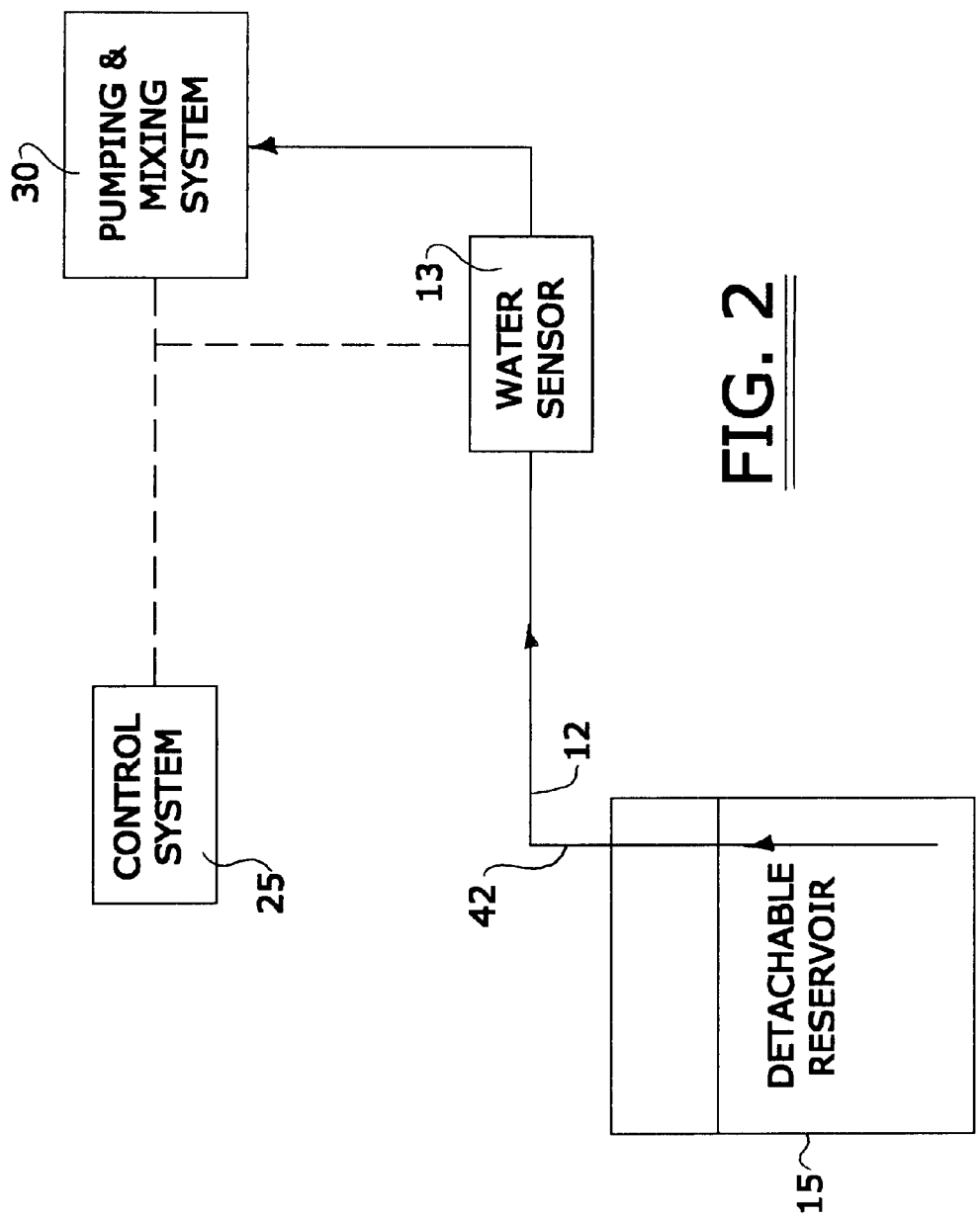
Figure 3:
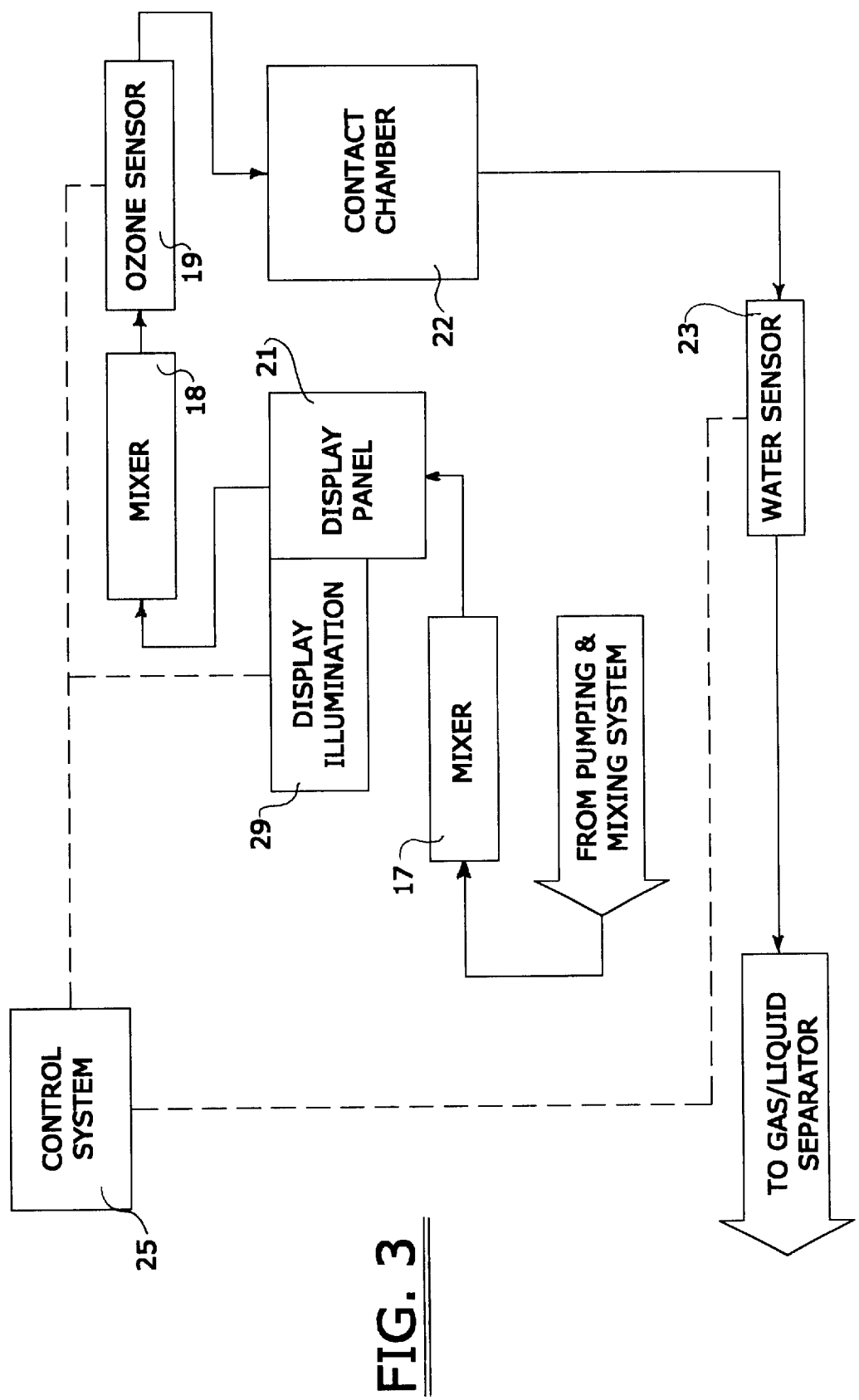

FIGS. 1–3 are schematic diagrams of preferred embodiments of the inventive purifier having many components in common. FIGS. 1 and 2 differ primarily in ways of admitting liquid to the purifying passageway, and FIG. 3 differs primarily in combining upflow chamber and display panel functions into a single element.

DETAILED DESCRIPTION

The preferred embodiments of the drawings have comparative advantages in features such convenience, reliability, safety, cost, and compactness. Different embodiments, using different combinations of such features, may be preferred for different users with different desires. Also, some of the different features that are illustrated in the drawings can be interchanged among the various embodiments, and the drawings are arranged to illustrate the different features that can be combined and not to delimit one combination of features from another.

The invention will first be explained relative to the embodiment illustrated in FIG. 1, and the description will follow the flows of liquid and ozone-containing gas in the purification process. This will reveal aspects of the invention in an order that is understandable but differs from the order of importance of the features involved.

First, the purification process applies to a small liquid batch sized for treatment in a purifier that can stand on a countertop. A typical example to which the invention is not limited is purifying a small batch of water for household usage. Other liquids can also be purified for other purposes, but the description of the invention will assume that water is being purified.

A batch of liquid to be purified in purifier 10 is deposited in a container or reservoir 15 that is preferably detachable from purifier 10. Detachability can be accommodated by providing a valved connection 11 at the bottom of container 15 that blocks any outflow from container 15 except when container 15 is properly mounted in position in purifier 10, which then opens valved connection 11 to passageway 12 leading out from reservoir 15. Liquid outflow does not necessarily occur upon mounting reservoir 15 in place, however.

Making container 15 detachable from purifier 10 has several advantages. A detachable container 15 is readily cleaned and can be filled remotely from purifier 10 and can carry to purifier 10 a quantity of liquid to be purified. A detachable container is also readily replaceable and allows more than one container to be used with a single purifier.

Liquid from reservoir 15 is purified as it flows through a passageway leading from container 15 to purified liquid dispenser 20. This invention involves several features that ensure that liquid reaching dispenser 20 is purified by contact with ozone and that no liquid reaching dispenser 20 evades ozone purification. Possible sources of contamination can include liquid remaining in the purifier after a previous purification cycle, bacteria or infectious agents entering the purifier between purification cycles, and an initial flow of untreated liquid advancing beyond a region of contact with an ozone-containing gas, to precede the process that otherwise purifies subsequent liquid. All of these possible sources of impurity are addressed by various features of the invention.

Whenever a pumping and mixing system relies upon an established flow to induct (venturi) or draw in an ozone-containing gas, it is likely that a quantity of untreated liquid will pass prior to the induction of the ozone-containing gas. Since the preferred embodiment of the instant invention includes a contact chamber 22, which provides plug flow, it is prudent to ensure that the initial liquid through the system upon start up is intimately contacted with an ozone-containing gas. An upflow chamber 40 provides this intimate contact between the initial liquid and ozone-containing gas.

Preferably near the beginning of the purification passageway 12 is a liquid sensor 13 that detects the presence of liquid and communicates with a control system 25. Such communication between control system 25 and components of purifier 10 is indicated by broken lines. Liquid sensor 13 can also be arranged in other locations. Downstream of the position illustrated for liquid sensor 13 is a pumping and mixing system 30 for moving liquid to be purified and mixing an ozone-containing gas into contact with the liquid.

The ozone-containing gas is derived from ozone generator 35, which, along with pumping and mixing system 30, is in communication with control system 25. Air enters ozone generator 35 via a desiccant 31 that reduces moisture in the air to improve the efficiency of ozone generation. A valve 32 upstream of desiccant 31 blocks air from entering desiccant 31 until a negative flow pressure is established downstream of valve 32. Such a negative pressure can overcome a spring bias within valve 32 and allow air to enter desiccant 31. Otherwise, blocking air from desiccant 31 keeps moisture out of desiccant 31 at times when purifier 10 is not operating, and this prolongs the useful life of desiccant 31.

Downstream of ozone generator 35 is a flow control 33, preferably in the form of a flow constriction. It is also possible to make ozone generator 35 incorporate a flow constriction into its structure so that air does not flow too readily through ozone generator 35 and into pumping system 30. This helps pumping system 30 draw liquid from container 15 upon actuation to establish a liquid flow, and not merely draw a gaseous flow through ozone generator 35.

When purifier 10 is started up by actuation of start switch 16, control system 25 preferably actuates ozone generator 35 before actuating pumping system 30. This allows ozone generator 35 to start operating and produce a quantity of ozone ready to mix with liquid as soon as liquid flow commences. Shortly after ozone generator 35 starts operating, pumping system 30 begins pumping and, partially by virtue of flow restriction 33, draws liquid from container 15 for treatment. An ozone-containing gas from generator 35 mixes with liquid flowing through pumping system 30 to begin the purification process.

A valve 14 is preferably arranged somewhere near the beginning of the liquid purification passageway to keep liquid from container 15 from flooding through purifier 10 before a purification cycle has begun. Possible locations for such a valve 14 include proximity to reservoir 15 in passageway 12 upstream of pumping system 30 or downstream of pumping system 30. Valve 14 remains closed until pumping system 30 operates and then opens to allow liquid flow. Valve 14 thus blocks liquid from proceeding downstream except when pumping system 30 and ozone generator 35 are operating. Valve 14 also limits the amount of an initial flow of liquid that can enter purifier 10 ahead of ozone from generator 35.

Although liquid and ozone mixing occurs in pumping system 30, additional liquid and ozone mixing is preferably accomplished downstream of pumping system 30. Static mixers 17 and 18 are one way to do this, and active mixing is also possible.

With the illustrated arrangement as described so far, fluid flow reaching mixer 17 includes an initial flow of liquid mixed with an ozone-containing gas from generator 35. Because the ozone-containing gas is drawn into mixing system 30 in response to liquid flow, there is a risk that initial liquid reaching mixer 17 may have preceded any substantial rate of flow of ozone-containing gas. To ensure that the initial liquid flow is adequately contacted with ozone, the output from mixer 17 enters upflow chamber 40.

Upflow chamber 40 is preferably configured so that an initial flow of liquid rises from the bottom to the top of upflow chamber 40 at a rate slow enough so that rising bubbles of ozone-containing gas can overtake the leading flow of the rising liquid. Some of the ozone from generator 35 quickly dissolves in the liquid in mixing system 30 and mixer 17, but preferably an excess of ozone-containing gas is carried along by the liquid to the upflow chamber 40 sized to allow the bubbles to rise at a rate faster than that of the liquid. Such bubbles are buoyant and quickly rise through the liquid rising in upflow chamber 40 so that the rising liquid is overtaken by rising bubbles of ozone-containing gas. This ensures that the leading volume of the liquid flow is contacted with ozone early in its advance through the purification passageway. This also ensures that ozone at the leading flow of liquid is available to purify any residue remaining in the passageway. This applies whether the purifier starts up full of liquid with a new liquid flow replacing previously purified liquid or whether the purifier starts up empty so that the new liquid flow is a liquid surface rising in the upflow chamber. Purifier 10 preferably can be operated either way.

Downstream of upflow chamber 40 is preferably another mixer 18, which also can be a static mixer. There, ozone-containing gas, which has overtaken the leading liquid flow, is mixed with the liquid to help dissolve the ozone and to ensure purifying contact of ozone with the liquid.

Upflow chamber 40 preferably has a translucent wall through which a user can observe rising bubbles and thereby verify that purifier 10 is working. Upflow chamber 40 is also preferably illuminated so that rising gas bubbles are readily visible, and I prefer that a viewing wall of upflow chamber 40 be colored or tinted to enhance the visual effect and to obscure any deposits such as iron oxide that may form in upflow chamber 40.

Upflow chamber 40 can have many different shapes that result in leading liquid flow rising at a slower rate than bubble flow. I prefer that upflow chamber be made wide, thin, and tall, which works well for this purpose; but many other shapes are also possible. Upflow chamber 40 also need not provide a visual display of rising bubbles, which alternatively can be done in display panel 21, described below.

Preferably downstream of mixer 18 and upflow chamber 40 is an ozone sensor 19 arranged in communication with control system 25. Ozone sensor 19 detects the presence of ozone in the liquid flow to verify that generator 35 is operating and that liquid flow is in contact with ozone and being purified. If no ozone is sensed, control system 25 deals with this appropriately, preferably by shutting down purifier 10, displaying a fault indication, etc. Ozone sensor 19 can also be arranged at other positions along the purification flow passageway.

Downstream of ozone sensor 19 is a display panel 21 that can make liquid flow and gas bubbles visible to a user if this has not already been done at upflow chamber 40. Display panel 21 is shaped to make rising bubbles visible and includes a translucent wall for viewing bubbles. These are preferably illuminated by display lamp 29. The components of display panel 21 can thus accomplish all the functions previously described for upflow chamber 40, which can be eliminated as shown in FIG. 3 when upflow and display functions are combined in a single chamber.

Downstream of display panel 21 is a contact chamber 22 which allows ozone time to contact impurities in the liquid and accomplish purification. There is evidence suggesting that dissolving and thoroughly mixing an adequate quantity of ozone within the liquid will accomplish purification rapidly and reduce the need for contact time provided by chamber 22. It is clear, though, that however ozone and liquid contact occurs, it is necessary for ozone to contact any microorganisms in a liquid to accomplish purification; and chamber 22 provides liquid flow time for such contact to occur.

Contact chamber 22 can have many different configurations, depending on cost, available space, and other considerations. One simple and preferred expedient is to direct the liquid flow through a length of tubing that will ensure adequate ozone and liquid contact for the length of time required to flow from the beginning to the end of the tubing. For this purpose, tubing should produce plug flow so that no shortcut path is available to evade sufficient contact time between ozone and liquid impurities.

Preferably downstream of contact chamber 22 is another liquid sensor 23 positioned in a region where the purification flow passageway is approaching dispenser 20. Purification is preferably completed by the time liquid flow leaves contact chamber 22.

Before purified liquid is dispensed, though, ozone gas is preferably separated from the liquid and disposed of safely, which is accomplished downstream of liquid sensor 23 in gas and liquid separator 24. Preferably a hydrophobic vent 26 blocks any passage of liquid, but allows gas to pass. This separates bubbles of ozone-containing gas from liquid flow so that the gas can be diverted. Before entering ambient atmosphere, diverted gas preferably passes through ozone reducer 27 so that purifier 10 does not introduce raw ozone into the atmosphere.

Downstream of gas and liquid separator 24 is a filter 28 that removes particles and residues from the purified liquid. Filter 28 is preferably positioned closely upstream of dispenser 20, but additional filters can be used in other liquid flow regions of purifier 10, if desired.

Any filter needs to be changed before it becomes clogged with particles, and purifier 10 preferably includes an indicator light 48 showing when filter 28 needs changing. Filter change light 48 can be illuminated by control system 25 after a predetermined time of operation of purifier 10 or after a predetermined number of purification cycles of purifier 10.

Dispensing of purified liquid can be done in many ways, and I prefer a movable spout 45 that can be moved to extend from purifier 10 for dispensing liquid and retract into purifier 10 when not needed for dispensing. Such a movable spout 45 can pivot or slide, and its movement can guide a flexible tube that is preferably concealed within spout 45. When spout 45 is extended, it provides a visual indication of readiness for dispensing. When spout 45 is retracted, it is preferably above container 15 so that any dribbles of liquid out of the purification passageway enter reservoir 15.

With movable spout 45, I prefer a spout switch 46 that prevents purifier 10 from operating unless spout 45 is extended. With such an arrangement, a user, after filling reservoir 15 and attaching it to purifier 10, extends spout 45, which actuates switch 46 so that start switch 16 is able to operate purifier 10. Alternatively, switch 46 can directly accomplish the start function of switch 16, which can then be eliminated so that extending spout 45 starts purifier 10 operating. Either way, initiation of purifier operation starts liquid flow through the purifying passageway as described above until the purified liquid passes through spout 45 and into purified liquid container 41, which the user has preplaced under spout 45. Using an extendible spout 45 helps the user tend to all the operations necessary for successful purification, including placing container 41 under spout 45.

As dispensing of purified liquid nears completion, sensor 13 detects lack of liquid upstream of pumping system 30. Shortly thereafter, control system 25 responds by shutting down pumping system 30 to avoid running pump 30 dry. Sensor 13, in cooperation with control system 25, thus serves as a pump protector.

A valve 47 is preferably placed at an outlet of dispenser 20, at the delivery end of spout 45, to open only when purified liquid is passing through the outlet. After a purification cycle is completed and liquid is no longer passing through the outlet of spout 45, valve 47 closes to prevent ambient microorganisms from entering spout 45 where they might survive in residual liquid.

Purifier 10 is preferably capable of purging residual liquid at the end of a purification cycle to help prevent liquid contamination between cycles. For this purpose, I prefer an air pump 36 arranged downstream of the liquid pumping system 30. Air pump 36 is preferably controlled by system 25 and turned on when lack of liquid is sensed at sensor 13. Liquid pump 30 is effective for causing liquid flow only while receiving incoming liquid; so when liquid is no longer entering pumping system 30, as detected by sensor 13, air pump 36 takes over to purge liquid remaining in the purification passageway toward dispenser 20. In effect, air pump 36 blows residual liquid out of the system so that it will not remain behind where it would be subject to possible future contamination.

Air pump 36 is also preferably operable selectively via air pump switch 37. By the setting of switch 37, a user can select whether air pump 36 operates to purge residual liquid from purifier 10. If more than one liquid batch is to be purified in succession, for example, an air purge can be postponed by means of switch 37 until the last batch in a sequence is completed.

A lamp 29, controlled by system 25, illuminates bubbles rising in display panel 21, which can be separate from or combined with upflow chamber 40 as previously described. In addition to lamp 29, control system 25 also can illuminate indicator lights to show operation of purifier 10, completion of a purification cycle, or shut down of purifier 10 for a detected fault.

The embodiment of FIG. 2 is substantially similar to the embodiment of FIG. 1, but differs in the way that outflow is achieved from detachable reservoir 15. Instead of a valved connection 11, the embodiment of FIG. 2 uses a vertical passageway 42 that leads or extends above a liquid level within container 15 before entering liquid flow passageway 12. Elevated passageway 42 prevents liquid from container 15 from draining into and flooding purifier 10 before the purifier starts operating. Pumping system 30 draws liquid through elevated passageway 42 to establish liquid flow when the purifier starts operating, and passageway 42 saves the expense of valved connector 11. It can also substitute for and therefore reduce the need for a flow-blocking valve 14.

I claim:

1. A method of purifying a batch of liquid with ozone wherein the batch of liquid is released from a storage container and is mixed with an ozone-containing gas produced from a generator to form a liquid/ozone mixture, wherein the mixture is conveyed through a passageway to produce a purified batch of liquid that can flow out of the purifier through a dispenser, the method comprising:

a. after mixing the ozone-containing gas with liquid flow commencing at the beginning of the batch purification cycle, directing the liquid and ozone mixture in an upflow chamber in which an initial flow of liquid rises as bubbles of ozone-containing gas rise at a faster rate to overtake the preceding liquid so that a leading volume of liquid flow is contacted with ozone early in its advance through the passageway; and b. blocking entry of untreated liquid into the passageway except when the purifier is purifying liquid flow.

2. The method of claim 1 including illuminating the upflow chamber to make the rising bubbles visible.

3. The method of claim 1 including coloring a viewing wall of the upflow chamber through which the rising bubbles are visible.

4. The method of claim 1 including starting the ozone generator before starting the liquid flow.

5. The method of claim 1 including configuring the liquid and ozone flow downstream of the upflow chamber to ensure sufficient ozone contact with the liquid to purify the liquid before it reaches the dispenser.

6. The method of claim 1 including constricting air flow through the generator to enable a pumping system to cause the liquid flow.

7. The method of claim 1 including stopping a liquid flow pump after the liquid is no longer flowing.

8. The method of claim 1 including mixing a liquid and gas flow in the passageway.

9. The method of claim 1 including pumping air into the liquid passageway to help empty the liquid passageway after a purification cycle.

10. The method of claim 1 including indicating a need to change a filter upstream of the purified liquid dispenser.

11. The method of claim 10 including basing the filter change indication on an extent of purifier operation.

12. The method of claim 1 including separating gas from the purified liquid downstream of the upflow chamber.

13. The method of claim 1 including dispensing purified liquid through an extendible dispensing outlet.

14. The method of claim 13 including activating liquid purification upon extending the dispenser outlet and deactivating liquid purification upon retracting the dispenser spout.

15. The method of claim 13 including closing the dispensing outlet except when purification is occurring.

16. The method of claim 1 including blocking an air inlet to a desiccant upstream of the generator except when air is drawn into the generator.

17. The method of claim 13 including blocking liquid flow unless the dispensing outlet is extended.

18. The method of claim 1 including making a container for untreated liquid detachable from a purifier of the liquid.

19. A liquid purifier combining an unpurified liquid batch container, a liquid flow passageway leading from the container to a purified liquid dispensing outlet, a generator producing an ozone-containing gas, and a pumping system to flow liquid through the liquid flow passageway at a certain volumetric rate, wherein a batch of unpurified liquid from the container is mixed with the ozone-containing gas from the generator to form a liquid/ozone mixture and the mixture is conveyed through the passageway, is purified, and leaves the purifier through the dispensing outlet, the purifier comprising:
   a. an upflow chamber of the liquid passageway downsteam of a region where the ozone-containing gas joins the liquid shaped and sized such that the volumetric rate of liquid flow through the liquid flow passageway produced by the pumping system causes liquid entering the upflow chamber to rise in the upflow chamber at a certain rise rate, which certain rise rate is slower than the rate at which bubbles of the ozone-containing gas entrained in the liquid rise in the liquid; and
   b. the liquid passageway includes ozone and liquid mixing and a liquid flow configuration that ensures purifying contact of the liquid with ozone before the liquid reaches the dispensing outlet.

20. The purifier of claim 19 wherein a wall of the upflow chamber transmits light and makes the rising bubbles visible.

21. The purifier of claim 20 including an illuminator enhancing the visibility of the rising bubbles.

22. The purifier of claim 20 wherein the light-transmitting wall of the upflow chamber is colored.

23. The purifier of claim 19 including a barrier to entry of the liquid into the passageway before the pumping system operates.

24. The purifier of claim 19 wherein the ozone generator operates before liquid flows in the passageway.

25. The purifier of claim 19 including a mixer upstream of the upflow chamber.

26. The purifier of claim 19 including a constriction in a flow of air through the generator enabling the pumping system to draw liquid from the container.

27. The purifier of claim 19 including a pump controller arranged for stopping a liquid pump after liquid stops flowing to the pump.

28. The purifier of claim 19 including an air pump connected to the liquid passageway and arranged to help empty the liquid passageway of liquid after a purification cycle.

29. The purifier of claim 28 including an air pump controlling system responsive to liquid in the passageway for turning the air pump on and off.

30. The purifier of claim 19 wherein the dispensing outlet is closed when purified liquid is not being dispensed.

31. The purifier of claim 19 wherein the dispensing outlet includes a movable spout that can be extended beyond a housing of the purifier.

32. The purifier of claim 31 wherein liquid flow is blocked unless the spout is extended.

33. The purifier of claim 31 including a system for starting and stopping the purifier respectively in response to extension and retraction of the dispensing outlet.

34. The purifier of claim 19 including a gas-liquid separator arranged in the liquid passageway downstream of the upflow chamber.

35. The purifier of claim 19 including a mixer downstream of the upflow chamber.

36. The purifier of claim 19 including a valve upstream of a desiccant in an air inlet to the generator for preventing moist air from entering the desiccant except when air is drawn into the generator during operation.

37. The purifier of claim 19 wherein the container is detachable from the purifier.

38. A method of operating the purifier of claim 19, the method comprising:
   a. after mixing the ozone-containing gas with liquid flow commencing at the beginning of a batch purification cycle; directing the liquid and ozone mixture into the upflow chamber in which the initial flow of liquid rises as bubbles of ozone-containing gas rise at a faster rate to overtake the preceding liquid; and
   b. blocking entry of untreated liquid into the passageway except when the purifier is purifying liquid flow.

39. In a batch liquid purifier having a batch of unpurified liquid mixed with an ozone-containing gas produced from a generator to produce a liquid/ozone mixture, wherein the mixture is conveyed through a passageway to produce a purified batch of liquid that can flow out of the purifier through a dispenser, an improvement comprising:
   a. a valve in the passageway preventing admission of untreated liquid into the passageway when the purifier is not operating;
   b. a pumping system that operates when the purifier is operating to admit untreated liquid to the passageway, to flow liquid through the passageway at a certain volumetric rate, and to mix the ozone-containing gas with the liquid flowing in the passageway to dissolve the ozone in the liquid;
   c. the liquid passageway downstream and adjacent to the mixing of the ozone-containing gas with the liquid being formed as an upflow chamber shaped and sized such that the volumetric rate of liquid flow through the passageway produced by the pumping system causes liquid entering the upflow chamber to rise in the upflow chamber at a certain rise rate, which certain rise rate is slower than the rate at which bubbles of the ozone-containing gas entrained in the liquid rise in the liquid; and d. a portion of the liquid flow passageway between the upflow chamber and the dispenser configured to ensure sufficient contact between ozone and the liquid to purify the liquid before it reaches the dispenser.

40. The improvement of claim 39 including a light-transmitting wall of the upflow chamber making bubbles visible as they rise within the chamber.

41. The improvement of claim 40 including an illuminator arranged for enhancing the visibility of the rising bubbles.

42. The improvement of claim 40 wherein the light-transmitting wall is colored.

43. The improvement of claim 39 wherein the generator operates before liquid flows in the passageway.

44. The improvement of claim 39 including a filter for the liquid being dispensed and an indicator showing a need to change the filter.

45. The improvement of claim 44 wherein the indicator is responsive to an extent of operation of the purifier.

46. The improvement of claim 39 including a mixer in the liquid passageway.

47. The improvement of claim 46 including a mixer upstream of the upflow chamber and a mixer downstream of the upflow chamber.

48. The improvement of claim 39 including a constriction in an air flow through the generator enabling the pumping system to draw liquid from the container.

49. The improvement of claim 39 including a pump protector arranged for stopping liquid pumping after the container is empty.

50. The improvement of claim 39 including an air pump connected to the liquid passageway and arranged to help empty the liquid passageway of liquid after a purification cycle.

51. The improvement of claim 50 including a liquid sensing system arranged to control the air pump.

52. The improvement of claim 39 wherein the liquid dispenser includes a movable spout that can be extended beyond a housing of the purifier.

53. The improvement of claim 52 wherein extending the spout activates the purifier and retracting the spout deactivates the purifier.

54. The improvement of claim 52 including a switch that blocks dispensing unless the spout is extended.

55. The improvement of claim 39 including a gas-liquid separator arranged in the liquid passageway upstream of the dispenser.

56. The improvement of claim 39 including a valve upstream of an outlet of the dispenser arranged for closing the dispenser outlet when liquid is not being dispensed.

57. The improvement of claim 39 including a desiccant and a valve upstream of the ozone generator arranged so that the valve opens an inlet to the desiccant only when air flow enters the generator during purifier operation.

58. The improvement of claim 39 wherein the container is detachable from the purifier.

* * * * *